United States Patent
Hawkins et al.

(10) Patent No.: US 8,639,693 B1
(45) Date of Patent: Jan. 28, 2014

(54) PERSONALIZED PLACE RECOMMENDATIONS USING COLLECTIONS OF PLACE LISTINGS

(75) Inventors: John Hawkins, London (GB); Andrew Eland, Zurich (CH); Bernhard Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/294,602

(22) Filed: Nov. 11, 2011

Related U.S. Application Data (60) Provisional application No. 61/413,641, filed on Nov. 15, 2010.

(51) Int. Cl.
*G06F 17/30* (2006.01)
(52) U.S. Cl.
USPC .......................................... 707/736; 707/737
(58) Field of Classification Search
USPC ................................. 707/736, 737
See application file for complete search history.

(56) References Cited

U.S. PATENT DOCUMENTS

2009/0292677 A1* 11/2009 Kim ................................. 707/3
2009/0299998 A1* 12/2009 Kim ................................. 707/5

* cited by examiner

*Primary Examiner* — Baoquoc N To
(74) *Attorney, Agent, or Firm* — Lerner, David, Littenberg, Krumholz & Mentlik, LLP (57) ABSTRACT

Personal recommendations are provided to users based on a relationship between place listings which with a user has interacted and collections of place listings. The user may interact with a place listing by reviewing the place, or accessing a web page that includes user-reviewed places. The collections of place listings are used to calculate a recommendation score for a candidate listing based on aggregate co-occurrence of the place listing and the candidate listing in the collections. The recommendation scores identify a probability that the user would appreciate the candidate listing based on the user's interaction with the place listing. Justifications may also be provided for display on the user's device to identify the relevance of the recommended listing.

20 Claims, 4 Drawing Sheets

PERSONALIZED PLACE RECOMMENDATIONS USING COLLECTIONS OF PLACE LISTINGS

CROSS-REFERENCE TO RELATED APPLICATIONS

The present application claims the benefit of the filing date of U.S. Provisional Patent Application No. 61/413,641, filed Nov. 15, 2010, the entire disclosure of which is hereby incorporated herein by this reference in its entirety.

BACKGROUND

Various network-based search applications allow a user to enter search terms and receive a list of search results. Such applications commonly use ranking algorithms to ensure that the search results are relevant to the user's query. For example, some systems rank such results based on reliability and safety of the search result, location of the user and search result, etc. These services may also provide place listings (e.g., business or government agency listings) in response to a particular search query.

SUMMARY

Aspects of the disclosure relate generally to providing personalized place recommendations to users based on a relationship between place listings which with a user has interacted and collections of place listings. The user may interact with a place listing by reviewing the place, or accessing a web page that includes the user-reviewed places. The collections of places are used to calculate a recommendation score for a candidate listing based on aggregate co-occurrence of the place listing and the candidate listing in the collections. The recommendation scores identify a probability that the user would appreciate the candidate listing based on the user's interaction with the place listing. Justifications may also be provided for display on the user's device to identify the relevance of the recommended listing.

In one aspect, a computer-implemented method includes using a processor to generate a plurality of collections of place listings. Each place listing in the same collection includes a common trait that is based on a user's interaction of the place listings. The page listings with which the user has interacted are identified. Candidate listings are identified, where at least one of the candidate listings is a member of a same collection of which at least one of the seed listings is a member. A determination is made regarding which collections include, as members, at least one of the candidate listings and at least one of the seed listings.

A weight value is calculated for each seed listing and each candidate listing in each collection. The weight value indicates a strength of association between either the seed listing and the corresponding collection or the candidate listing and the corresponding collection. A recommendation score is calculated for each candidate listing based on the weight values of the seed listings and the weight values of the candidate listings. The recommendation score indicates a likelihood that the user would be interested in the candidate listing. In the event that any of the recommendation scores exceed a threshold, the at least one candidate listing that corresponds to the recommendation score that exceeds the threshold is provided for display on a computing device.

In another aspect, a system includes a memory configured to store a plurality of place listings and a processor configured to execute a plurality of modules. The modules include a collection assembly and mapping module, a collection identification module, a weight value calculation module, and a recommendation score calculation module.

The collection assembly and mapping module is configured to: generate a plurality of collections of the place listings, wherein each place listing in the same collection includes a common trait, the common trait being based on a user's interaction with the place listings; identify each place listing with which the user has interacted as a seed listing; and identify a plurality of candidate listings, wherein at least one of the candidate listings is a member of a same collection of which at least one of the seed listings is a member.

The collection identification and comparison module is configured to determine the collections which include as members at least one of the candidate listings and at least one of the seed listings.

The weight value calculation module is configured to calculate a weight value for each seed listing and each candidate listing in each collection, wherein the weight value indicates a strength of association between either the seed listing and the corresponding collection or the candidate listing and the corresponding collection.

The recommendation score calculation module is configured to: calculate a recommendation score for each candidate listing, wherein the recommendation score is calculated based on the weight values of the seed listings and the weight values of the candidate listings, the recommendation score indicating a likelihood that the user would be interested in the candidate listing; determine that at least one of the recommendation scores exceed a threshold; and provide the candidate listings that corresponds to the at least one of the recommendation scores that exceeds the threshold for display on a computing device.

DETAILED DESCRIPTION

The aspects, features and advantages of the present disclosure will be appreciated when considered with reference to the following description of example embodiments and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes personalized place recommendations provided to users based on a relationship between place listings which with a user has interacted and collections of place listings. The user may interact with a place listing by providing a review for the place, or by accessing a web page that includes user-reviewed places. The collections of places are used to calculate a recommendation score for a candidate listing based on aggregate co-occurrence of the place listing and the candidate listing in the collections. The recommendation scores identify a probability that the user would appreciate the candidate listing based on the user's interaction with the place listing. Justifications may also be provided for display on the user's device to identify the relevance of the recommended listing.

Figure 1:
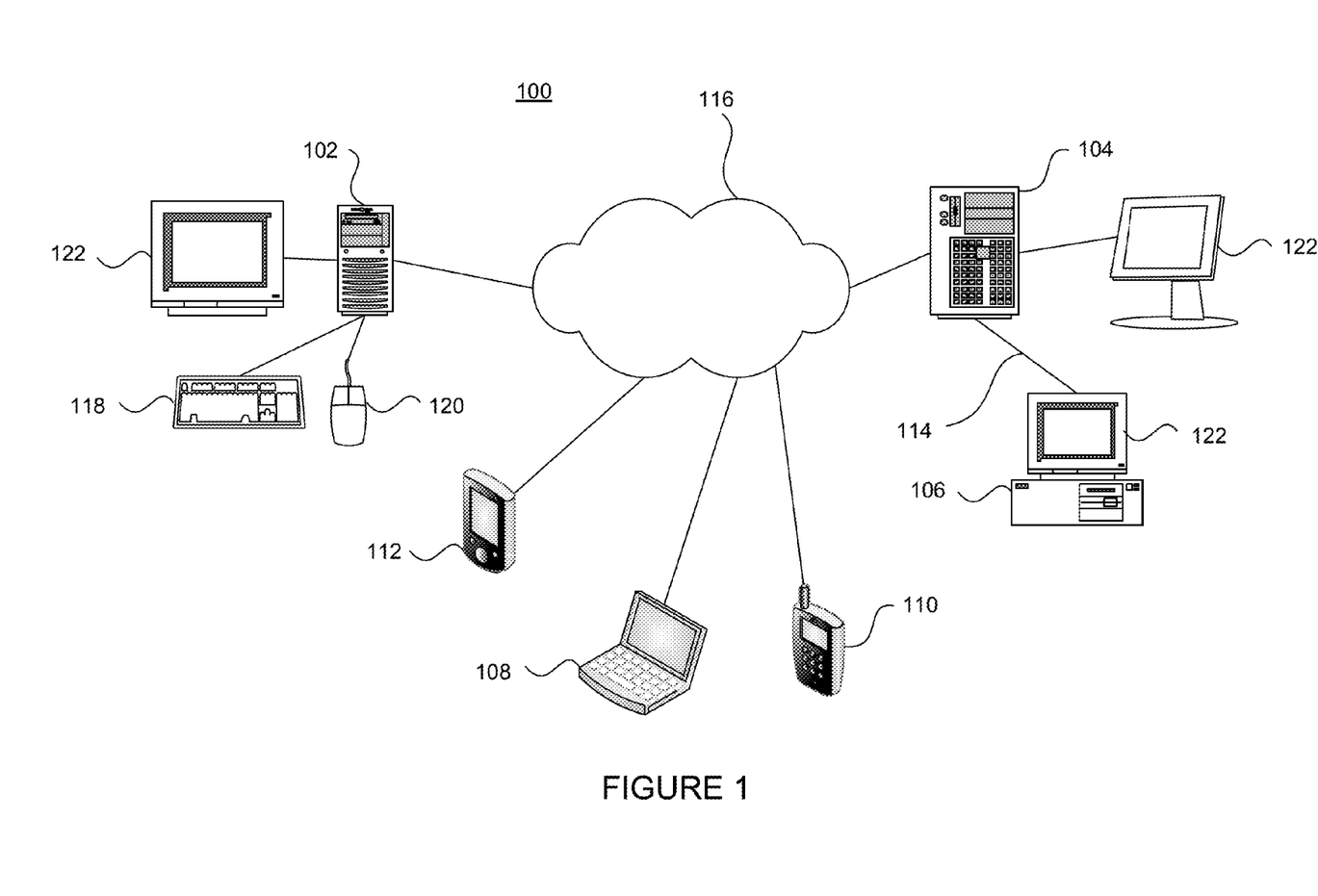
FIG. 1 illustrates a system in accordance with example embodiments.

FIG. 1 presents a schematic diagram of a computer system depicting various computing devices that can be used alone or in a networked configuration in accordance with aspects of the disclosure. For example, this figure illustrates a computer network 100 having a plurality of computers 102, 104, 106, 108 as well as other types of devices such as a mobile phone 110 and a PDA 112. Such devices may be interconnected via a local or direct connection 114 and/or may be coupled via a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

The computer 104 may communicate with one or more of client computers 102, 106 and/or 108, as well as client devices such as mobile computing device 110 and PDA 112. Each computer or other client device may be similarly configured with a processor, memory and instructions, as well as one or more user input devices 118 and a user output device, such as display 122, as discussed with reference to FIG. 2. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

Figure 2:
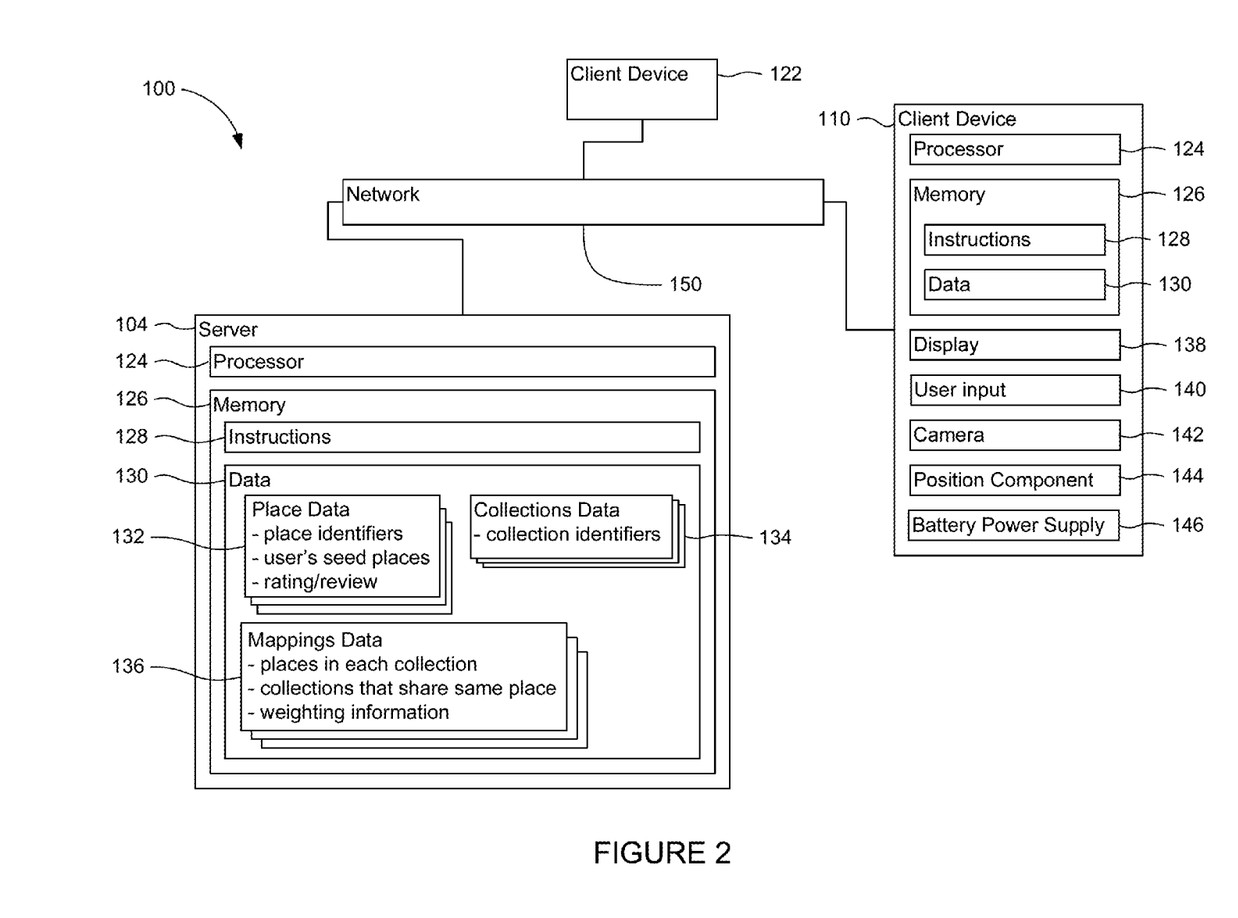
FIG. 2 illustrates aspects of the system of FIG. 1.

The computer 104 and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network 116, including any intervening nodes, may be facilitated by any device capable of transmitting data to and from other computers, such as modems (e.g., dial-up or cable), network interfaces and wireless interfaces. Although certain advantages are obtained when information is transmitted or received as noted above, other aspects are not limited to any particular manner of transmission of information. For example, in some aspects, the information may be sent via a medium such as a disk, tape, CD-ROM, or directly between two computer systems via a dial-up modem.

Moreover, computers and user devices in accordance with the systems and methods described herein may comprise any device capable of processing instructions and transmitting data to and from other computers, including network computers lacking local storage capability, PDAs with modems such as PDA 112 and Internet-capable wireless phones such as mobile phone 110.

As shown in FIG. 2, each computer, such as server 104 and client devices 110, 122, contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor 124. The memory/storage 126 may be of any type or any device capable of storing information accessible by the processor 124, including a computer-readable medium, or other medium that stores data that may be read with the aid of an electronic device, such as a hard-drive, memory card, ROM, RAM, CD-ROM or other optical disks, flash memories, write-capable or read-only memories. In that regard, memory/storage 126 may include short term or temporary storage as well as long term or persistent storage. Systems and methods may include different combinations of the foregoing, whereby different portions of the instructions 128 and data 130 are stored on different types of media.

The processor 124 may comprise any number of well known processors, such as a CPU. Alternatively, the processor may be a dedicated controller for executing operations, such as an ASIC. Although FIG. 2 functionally illustrates the processor 124 and memory 126 as being within the same block, the processor 124 and memory 126 may actually comprise multiple processors and memories that may or may not be stored within the same physical housing. For example, the processor 124 may comprise a collection of processors which may or may not operate in parallel, and memory 126 may be a hard drive or other storage media located in a server farm of a data center. Some or all of the instructions 128 and data 130 may be stored in a location physically remote from, yet still accessible by, the processor 124. For example, data 130 may be distributed and stored across multiple memories 126 such as hard drives or the like. Accordingly, references to a processor, a computer or a memory will be understood to include references to a collection of processors or computers or memories that may or may not operate in parallel.

The instructions 128 may include any set of instructions to be executed directly (such as machine code) or indirectly (such as scripts) by the processor(s). For example, the instructions may be stored as computer code on the computer-readable medium. In that regard, the terms "instructions," "steps" and "programs" may be used interchangeably herein. The instructions 128 may be stored in any computer language or format, such as in object code or modules of source code. The functions, methods and routines of the instructions 128 are described in detail below.

Data 130 may be retrieved, stored or modified by processor 124 in accordance with the instructions 128. The data 130 may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data 130 may include any information sufficient to identify the relevant information, such as descriptive text, proprietary codes, pointers, references to data stored in other memories (including other network locations) or information which is used by a function to calculate the relevant data.

The data 130 stored on server 104 may include place data 132, collections data 134 and mappings data 136. The place data 132 may include a place identifier for each place listing that may be provided as a result of a search. The place data may also include "seed places" which correspond to specific place listings that a user has previously accessed, and a corresponding rating for the seed place. For example, the seed places may include listings of places that a user has commented on and provided a rating or review. In another example, the seed places include place listings that are included on a same web page as places that a user has commented on and provided a rating or review. The ratings/reviews provide an indication of the user's level of satisfaction associated with the place listing.

The collections data 134 includes collection identifiers for each collection. Each collection includes a group of place listings that share a common trait. For example, one collection may include place listings that a user has reviewed and rated. Another collection may have one or more places that are included on the same web page. A further collection may include places included on the same map.

The mappings data 136 includes mappings between the place listings and the collections. One mapping may include the place listings that are included in each collection. Another mapping may identify each collection in which a particular place listing is included. The mappings data 136 may also include weighting information for modeling varying degrees of membership for a place listing in a particular collection. For example, in a collection of user-rated places, a higher rated place is provided a larger weight value than a lower rated place.

Although the client devices 110, 122 may each comprise a full-sized personal computer, they may alternatively comprise mobile computing devices capable of wirelessly exchanging data. By way of example only, client device 110 may be a wireless-enabled PDA or a cellular phone capable of obtaining information via the Internet. The client device 110 may have all of the components normally used in connection with a mobile computing device such as processor 124, memory 126, instructions 128 and data 130, as described above. The client device 110 may include an electronic display 138 (e.g., a monitor having a screen, a touch-screen, a projector, a television, a computer printer or any other electrical device that is operable to display information), and user input 140 (e.g., a mouse, keyboard, touch-screen or microphone). The client device 110 may also include a camera 142, geographical position component 144, accelerometer, speakers, a network interface device, a battery power supply 146 or other power source, and all of the components used for connecting these elements to one another.

The geographical position component 144 may be used to determine the geographic location and orientation of the client device 110. For example, the client device 110 may include a GPS receiver to determine the device's latitude, longitude and altitude. Thus, as the client device 110 changes locations, for example by being physically moved, the GPS receiver may determine a new current location. The position component 144 may also comprise software for determining the position of the device 110 based on other signals received at the client device 110, such as signals received at a cellular phone's antennas from one or more cellular phone towers if the client device 110 is a cellular phone.

In addition to the operations described below and illustrated in the figures, various operations in accordance with aspects of the disclosure will now be described. It should also be understood that the following operations do not have to be performed in the precise order described below. Rather, various steps can be handled in a different order or simultaneously.

Figure 3:
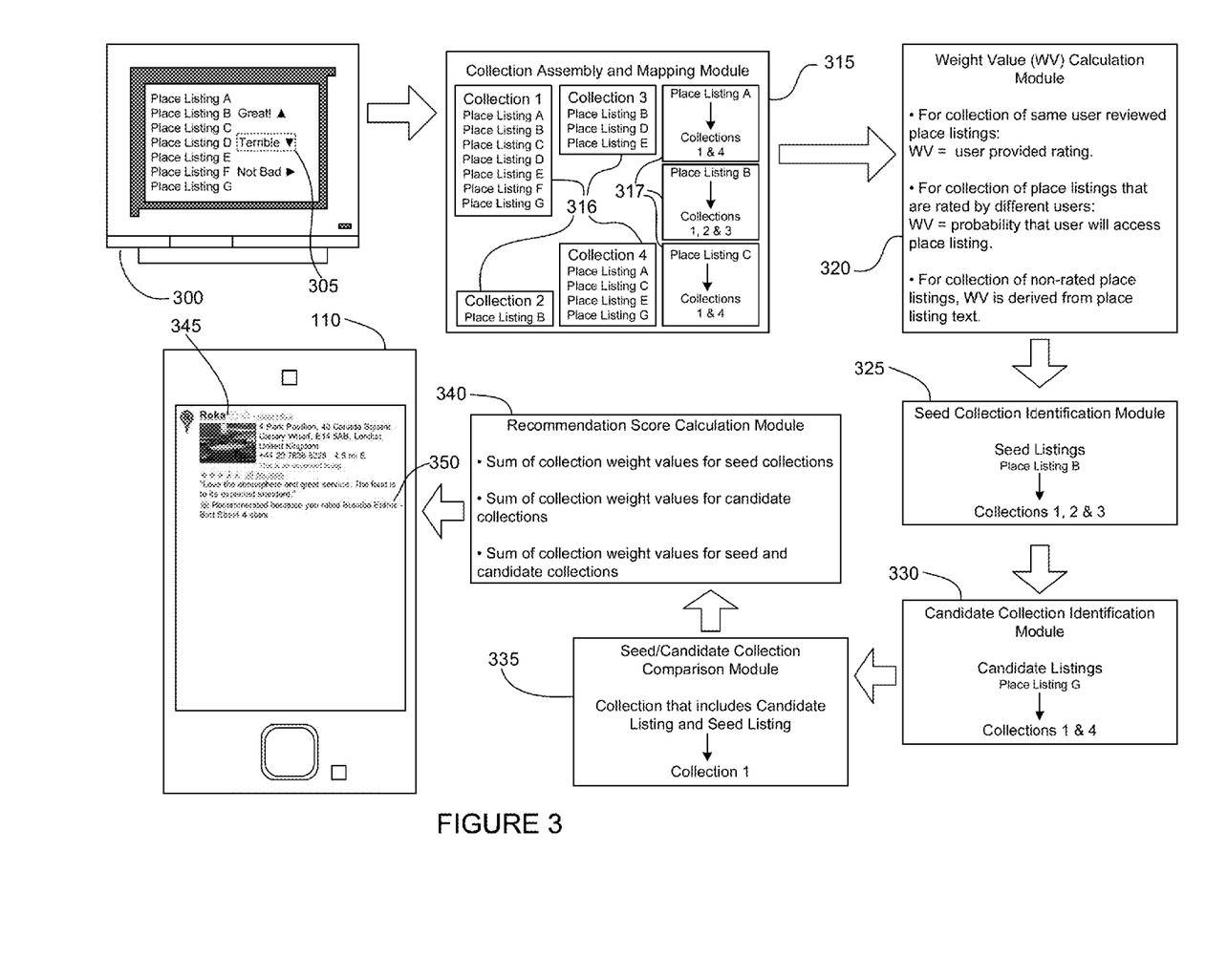
FIG. 3 is an exemplary pictorial diagram in accordance with example embodiments.

FIG. 3 illustrates the provision of personalized place recommendations using collections of place listings. A place listing may be any listing that corresponds to a particular geographic location (e.g., commercial establishment or government agency), and that may be provided in response to a search. Each place listing includes a unique place identifier. Groups of place listings may be combined in a collection that is identified by a unique collection identifier.

A user may browse different web pages on the Internet using a computer 300. At least some of the web pages include different place listings. As shown in the figure, Place Listings A-G are displayed to the user. The place listings may be provided as a list of search results, and may include ratings/reviews 305 provided by different users. The place listings may also appear on different web pages that the user accesses.

In one illustrative example, a web page may include a listing of ten Korean restaurants that are located in or near the same county. The user may provide a review regarding her experience at the restaurant identified by some of the place listings. Even though the user did not access all of the place listings, there is a high likelihood that the user may also appreciate the non-accessed listings since she is likely to enjoy Korean food.

A collection assembly and mapping module 315 is configured to assemble collections 316 of place listings and to provide mappings 317 of individual place listings to corresponding collections. The place listings may be assembled into collections 316 based on user interaction. One collection may include all of the place listings that were provided on a web page that was accessed by the user (e.g., Collection 1). Another collection may include only the place listings that the user accessed on a web page and provided with a favorable review or rating (e.g., Collection 2). Another collection may include all of the place listings that the user reviewed and rated (either positively or negatively) (e.g., Collection 3). A further collection may include the place listings that the user did not access on a web page (e.g., Collection 4). Even though the collections described herein are compiled from place listings that are presented on the same web page, the collections may be assembled with place listings from different web pages and may be assembled based on any common traits shared among the place listings.

After the collections 316 are assembled, the individual place listings are mapped to the corresponding collections to provide mappings 317. For example, one place listing (e.g., Place Listing A) is mapped to the different collections in which the place listing is included (e.g., Collection 1 and Collection 4). Another type of mapping identifies the place listings that are included in a given collection.

A weight value calculation module 320 is provided to determine a weight value for each place listing in a particular collection. The weight value provides an indication of a level of association between a particular place listing in the collection relative to the other place listings in the same collection. The method for calculating the weight value may be dependent on the type of place listings included in the collection. For a collection of place listings that are user-rated, the weight value for each place listing directly corresponds to the user-provided rating. Accordingly, place listings that have a high rating carry more weight and are more likely to be accessed by the user than low-rated place listings. For a collection of place listings reviewed by different users, a probability curve generated from user experience research may be used to determine the probability of a user accessing a particular place listing. For a collection of place listings represented only by text without any user-provided rating or review, the text may be used to determine the probability of a user accessing the place listing that includes the text.

A "seed" listing may be a place listing that has been reviewed or rated by any user. A seed listing may also include any place listings included on the same web page as other place listings that the user has reviewed/rated. In some cases, the seed listings may be the place listings that have been reviewed or rated favorably by the user (e.g., Place Listing B). In other cases, the seed listings may also include place listings that are on the same web page as the favorably reviewed/rated place listings.

A seed collection identification module 325 identifies the collections 316 that include seed listings by accessing the mappings 317 of the seed listings to the collections. Since Place Listing B is included in Collection 1, Collection 2 and Collection 3, the seed collection identification module 325 identifies Collections 1, 2 and 3 as seed collections. The seed collection identification module 325 then retrieves the identifiers for the seed collections.

A candidate collection identification module 330 identifies place listings that are provided as results in response to a particular search as candidate listings. In one example, a search may be performed for "hair salons in Dade County," and the candidate listings would include all results returned from that search. The candidate collection identification module 330 identifies the collections that include the candidate listings by accessing the mappings 317 of the candidate listings to the collections. In one example, Place Listing G is identified as a candidate listing. Since Place Listing G is included in Collection 1 and Collection 4, the candidate collection identification module 330 identifies Collections 1 and 4 as candidate collections. The candidate collection identification module 330 then retrieves the identifiers for the candidate collections.

In some embodiments, rather than being search results, the candidate listings are identified as the place listings that are included in the same collections as any seed listing. The result may be a large number of candidate listings. The candidate collections are then identified by the collection identification module 330 as the collections that include the candidate listings.

A seed/candidate collection comparison module 335 compares the candidate collection identifiers to the seed collection identifiers. The result is a determination of which candidate listings are included in the same collection as any seed listings. Using the example of Place Listing B as the seed listing and Place Listing G as the candidate listing, the collection that includes both Place Listing B and Place Listing G is determined to be Collection 1.

A recommendation score calculation module 340 is configured to calculate a user recommendation score for each candidate listing relative to the seed listing. The user recommendation score indicates a relationship between a seed listing and a particular candidate listing. In some embodiments, a high recommendation score indicates that the user would likely appreciate the candidate listing based on the user's seed listings.

In one embodiment, the user recommendation score may be the sum of collection weight values for all seed collections. In another embodiment, the user recommendation score may be the sum of collection weight values for all candidate collections. In a further embodiment, the user recommendation score may be the sum of collection weight values for all seed collections and candidate collections.

The recommendation score calculation module 340 may calculate the user recommendation score based on log likelihood curves. In the event that a ratio of shared collection weight values to non-shared collection weight values is high, the recommendation score is calculated to be high.

The recommendation score calculation module 340 may normalize the recommendation scores. The normalized scores may be accumulated across each seed listing which shares one or more collections with the candidate listing. In one embodiment, the recommendation score calculation module 340 may normalize a recommendation score using a historic distribution of score values and converting the recommendation score to a percentile within the distribution. The recommendation score of each seed listing may be further weighted based on the user's rating for the seed listing by converting the rating into a probability that is applied to the normalized score.

The recommendation score calculation module 340 determines if any of the recommendation scores for the candidate listings exceed a threshold. The threshold establishes a minimum probability that must be exceeded before the candidate listing is displayed to the user's device 110. A candidate listing that has a recommendation score that exceeds the threshold would likely be a place listing that is of interest to the user. Accordingly, the candidate listings having recommendation scores that exceed the threshold are displayed on the device 110 as recommended listings 345 for potential user access.

The recommendation score module may also provide a justification 350 for the recommended listing 345 on the user's device 110. The justification 350 may be generated based on an identification of the collections that contributed to the identification of the recommended listing 345 based on the seed listings and the related candidate listings. Accordingly, in some embodiments, the justification 350 may be displayed on the device 110 with a listing of seed listings that were used to identify the recommended listing 345.

Figure 4:
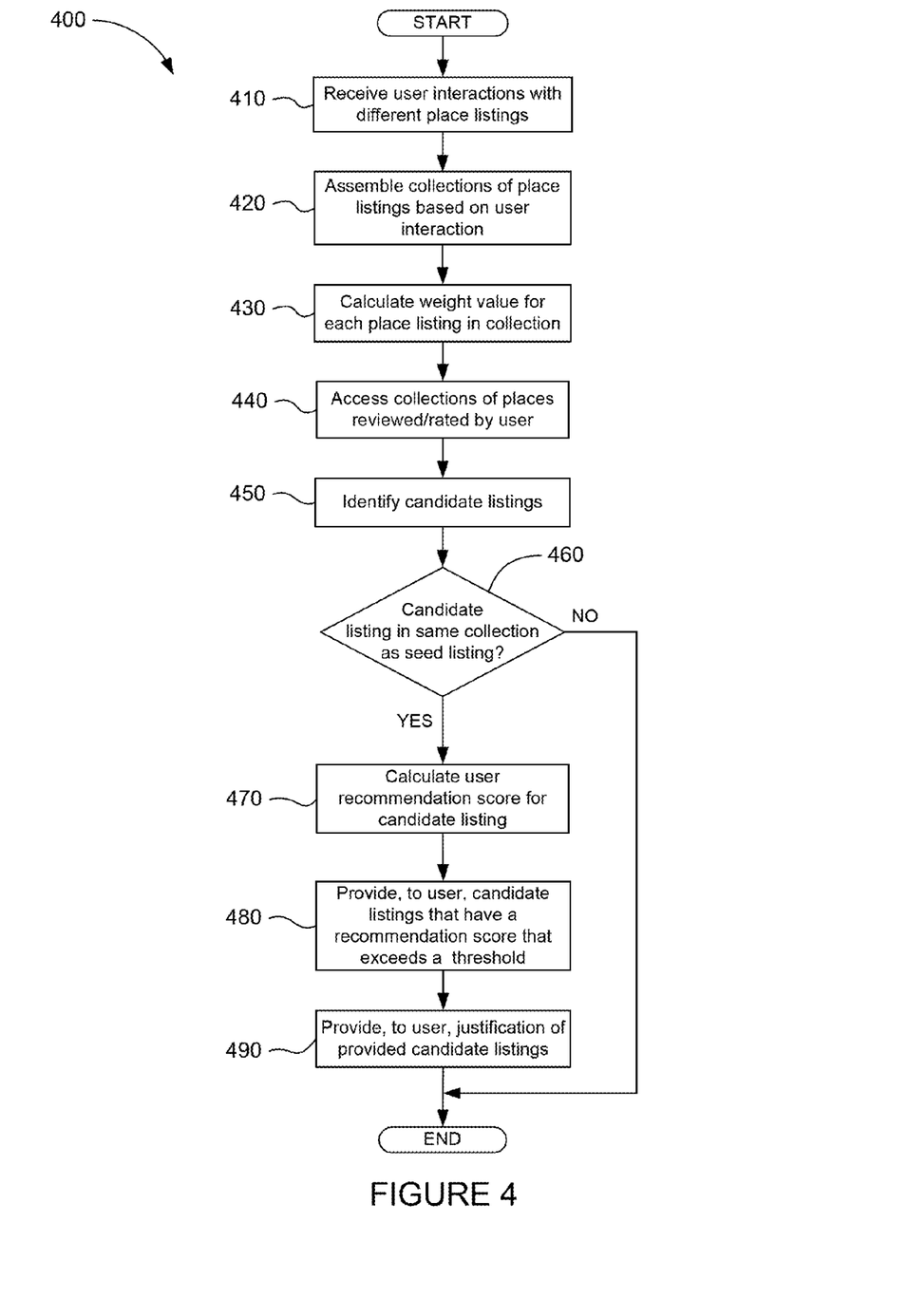
FIG. 4 is an exemplary flow diagram in accordance with example embodiments.

FIG. 4 illustrates a process 400 of providing personalized place recommendations using collections of place listings. A place listing may be any listing that may be provided as a result of a search and that corresponds to a particular location. Each place listing includes a unique place identifier, and each collection of places includes a unique collection identifier.

The process 400 begins when a user interacts with different place listings provided on web pages (step 410). In one example, the user may interact with a place listing by searching for the listing and then accessing the place listing to provide a review of the place including a rating. In another example, the user may interact with a place listing by accessing a web page that includes the place listing. The web page may include additional place listings that are related.

In one illustrative example, the web page includes place listings for each of the twenty largest libraries in the world, based on total volumes of books available. The user may directly access four of the place listings to provide a review and a rating. Even though the user did not access the other place listings, there is a high likelihood that the user may also appreciate the non-accessed listings of the world's largest libraries.

Collections of place listings are assembled based on the user's interaction with the place listings (step 420). In one example, a collection may include the different place listings that the user reviewed and rated. In another example, the collections also include the place listings provided on the same web page as a listing that the user reviewed and rated (e.g., all twenty library listings). Once the collections are assembled, mappings may be identified between place listings and collections. One mapping identifies the place listings in a particular collection, while another mapping identifies the different collections of which a place listing is a member.

A weight value is calculated for each place listing in a collection (step 430). The weight value may identify how strongly a particular place listing is associated with the collection relative to other place listings in the collection. In the case where a collection includes place listings that are user rated, a weight value for each place listing may correspond to the rating provided by the user such that place listings that have a high rating have a larger weight value than place listings that have a low rating. Thus, the place listings that have a high weight value are more likely to be accessed by the user than a place listing with a lower weight value. In the case where a collection is derived from user reviews, the probability of a user accessing the place listings is derived from a rating to a probability curve that is generated from user experience research. In the case where the collection represents textual content without ratings, such as a web page, the probability of a user accessing the place listing is derived from the text itself through, for example, sentimental analysis. Sentimental analysis refers to the attribution of sentiment (e.g., positive or negative emotions) to a particular segment of text by analyzing the words and grammar structure within the text segment.

The collections that include places that have been reviewed and/or rated by the user are accessed (step 440). In one embodiment, only the places that have been reviewed favorably are accessed. Such place listings may be referred to as "seed" listings. Seed listings may also refer to place listings that are included on a same web page as places that a user has reviewed/rated. The mapping of a single place listing to the different collections of which it is a member is used to determine the collections in which the seed listings are included. The "seed" collection identifiers are then retrieved for these collections.

Candidate listings are then identified (step 450). In some embodiments, the candidate listings may correspond to results of a search for a particular type of place (e.g., "restaurants in New York"). In this example, the candidate listings would correspond to restaurants in New York. For each candidate listing, the mapping is accessed to determine the different collections of which the candidate listing is a member. The "candidate" collection identifiers are then retrieved for these collections.

In other embodiments, the candidate listings are not provided in response to a search. Rather, the collections which include the user's seed listings are identified by the corresponding collection identifier, and all of the place listings in those collections are identified by place identifier. The candidate listings are then identified as all of the place listings in the same collections as the seed listings. This results in a potentially very large set of candidate listings that includes at least one shared collection with the user's seed listings.

The "candidate" collection identifiers are compared to the "seed" collection identifiers to determine whether any of the candidate listings are included in the same collection as the seed listings (step 460). If a candidate listing is not included in the same collection as any of the seed listings, processing is terminated because it is unlikely that the user would appreciate any of the candidate listings based on the user's seed listings. If a candidate listing is included in at least one collection that also includes a seed listing, processing continues to step 470.

A user recommendation score is calculated for the candidate listings (step 470). By way of example, three different variables may be used to calculate the recommendation score between one of the seed listings and the candidate listing: 1) the sum of collection weight values for all collections of which the seed listing is a member; 2) the sum of collection weight values for all collections of which the candidate listing is a member; and 3) the sum of collection weight values for all collections of which both the seed listing and the candidate listing are members. Any or all of these variables may be used when calculating the recommendation score. In some embodiments, the minimum weight value is used for a shared collection where the seed listing and the candidate listing have different weight values.

The recommendation score may be calculated based on log likelihood curves such that higher recommendation scores may be given where the ratio of shared collection weight values to non-shared collection weight values is higher. A high recommendation score indicates a strong likelihood that the user would appreciate the candidate listing based on the user's seed listings. Lower recommendation scores may be given in cases where information is unavailable to determine a score, or where only one of the places has a high weight value. In other words, the scoring process determines which of the user's seed listings are most strongly related to any particular candidate listing.

In some embodiments, the recommendation scores may be normalized to a predetermined range and then accumulated across each of the user's seed listings which have at least one shared collection with the candidate place. Normalization may be implemented by building a histogram of score values, and converting the score value to a percentile within the distribution. The recommendation score between each user seed listing may then be further weighted based the user's rating for that place, if a rating has been provided. Specifically, the score between a user and a place may be weighted by the user's rating by first converting the rating into a probability (using a technique similar to that described above), and then applying the probability to the normalized score.

A determination is then made which, if any, of the recommendation scores for the candidate listings exceed a threshold. The threshold may be a minimum probability that a user would be satisfied with the recommendation before the recommended candidate listing is displayed. The threshold may be varied depending on the environment in which the recommendations are being displayed. In the event that the recommendation score of at least one candidate listing exceeds the threshold, the corresponding candidate listings are provided to the user's device as recommended places (step 380). Accordingly, the user may access the recommended place listings on different web pages.

In addition to providing the recommended place listings to the user, a corresponding justification for each recommended place listing may also be provided to the user's device (step 490). Since it is known which of the user's seed listings are most strongly related to any particular candidate place, the collections that contributed most significantly to the recommended place listings may be identified. The justification for the recommended place listing may then be provided to the user's device with a list of the user's related seed listings and a list of the corresponding collections of which those seed listings are members.

As described above, personalized place recommendations are provided to users based on a relationship between place listings which with a user has interacted and collections of place listings. The user may interact with a place listing by reviewing the place, or accessing a web page that includes the user-reviewed places. A recommendation score is calculated for a candidate listing based on aggregate co-occurrence of the place listing and the candidate listing in the collections. Each recommendation score identifies a probability that the user would appreciate the corresponding candidate listing based on the user's interaction with the place listing. Justifications may also be provided for display on the user's device to identify the relevance of the recommended listing.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
generating, using a processor, a plurality of collections of place listings, wherein the place listings in each collection includes a common trait, the common trait being based on a user's interaction with the place listings;
identifying each place listing the user has interacted with as a seed listing;
identifying a plurality of candidate listings, wherein at least one of the candidate listings is a member of a particular collection of the plurality of collections and at least one of the seed listings is also a member of the particular collection;
determining the collections having at least one of the candidate listings and at least one of the seed listings as members;
calculating, using the processor, a weight value for each seed listing and each candidate listing in each collection, wherein the weight value indicates a strength of association between either the seed listing and the corresponding collection or the candidate listing and the corresponding collection;
calculating, using the processor, a recommendation score for each candidate listing, wherein the recommendation score is calculated based on the weight values of the seed listings and the weight values of the candidate listings, the recommendation score indicating a likelihood that the user would be interested in the candidate listing; and
in the event that any of the recommendation scores exceed a threshold, providing at least one candidate listing, having a recommendation score exceeding the threshold, for display on a computing device.

2. The method of claim 1, further comprising:
providing a justification for the at least one candidate listing for display on the computing device, wherein the justification is generated based on the seed listings.

3. The method of claim 1, wherein the user's interaction of the place listings comprises providing a review for at least one of the place listings.

4. The method of claim 1, wherein the user's interaction of the place listings comprises providing a rating for at least one of the place listings.

5. The method of claim 1, wherein the user's interaction of the place listings comprises browsing to a web page that includes at least one of the place listings.

6. The method of claim 1, wherein the candidate listings are identified from results provided in response to a search.

7. The method of claim 1, wherein the candidate listings are identified as the place listings that are included in a collection with at least one of the seed listings.

8. A system comprising:
a memory configured to store a plurality of place listings; and
a processor configured to execute a plurality of modules, wherein the modules comprise:
a collection assembly and mapping module configured to:
generate a plurality of collections of the place listings, wherein the place listings in each collection includes a common trait, the common trait being based on a user's interaction with the place listings,
identify each place listing the user has interacted with as a seed listing, and
identify a plurality of candidate listings, wherein at least one of the candidate listings and at least one of the seed listings are of a particular collection;
a collection identification and comparison module configured to determine the collections which include as members at least one of the candidate listings and at least one of the seed listings;
a weight value calculation module configured to calculate a weight value for each seed listing and each candidate listing in each collection, wherein the weight value indicates a strength of association between either the seed listing and the corresponding collection or the candidate listing and the corresponding collection;
a recommendation score calculation module configured to:
calculate a recommendation score for each candidate listing, wherein the recommendation score is calculated based on the weight values of the seed listings and the weight values of the candidate listings, the recommendation score indicating a likelihood the user would be interested in the candidate listing,
determine at least one of the recommendation scores exceed a threshold, and
provide the candidate listings corresponding to the at least one of the recommendation scores that exceeds the threshold for display on a computing device.

9. The system of claim 8, wherein the recommendation score calculation module is further configured to provide a justification for the at least one candidate listing for display on the computing device, wherein the justification is generated based on the seed listings.

10. The system of claim 8, wherein the user's interaction of the place listings comprises providing a review for at least one of the place listings.

11. The system of claim 8, wherein the user's interaction of the place listings comprises providing a rating for at least one of the place listings.

12. The system of claim 8, wherein the user's interaction of the place listings comprises browsing to a web page that includes at least one of the place listings.

13. The system of claim 8, wherein the candidate listings are identified from results provided in response to a search.

14. The system of claim 8, wherein the candidate listings are identified as the place listings that are included in a collection with at least one of the seed listings.

15. A computer-implemented method for providing personalized place recommendations, the method comprising:
generating, using a processor, a plurality of collections of place listings, wherein the place listings in each collection includes a common trait, the common trait being based on a user's interaction with the place listings;
identifying each place listing the user has interacted with as a seed listing;
identifying a plurality of candidate listings, wherein at least one of the candidate listings and at least one of the seed listings are members of a particular collection;
determining the collections having at least one of the candidate listings and at least one of the seed listings as members;
calculating, using the processor, a weight value for each seed listing and each candidate listing in each collection, wherein the weight value indicates a strength of association between either the seed listing and the corresponding collection or the candidate listing and the corresponding collection;

calculating, using the processor, a recommendation score for each candidate listing, wherein the recommendation score is calculated based on the weight values of the seed listings and the weight values of the candidate listings, the recommendation score indicating a likelihood that the user would be interested in the candidate listing; and in the event that any of the recommendation scores exceed a threshold:

providing at least one candidate listing that corresponds to the recommendation score that exceeds the threshold for display on a computing device, and providing a justification for the at least one candidate listing for display on the computing device, wherein the justification is generated based on the seed listings.

16. The method of claim 15, wherein the user's interaction of the place listings comprises providing a review for at least one of the place listings.

17. The method of claim 15, wherein the user's interaction of the place listings comprises providing a rating for at least one of the place listings.

18. The method of claim 15, wherein the user's interaction of the place listings comprises browsing to a web page that includes at least one of the place listings.

19. The method of claim 15, wherein the candidate listings are identified from results provided in response to a search.

20. The method of claim 15, wherein the candidate listings are identified as the place listings that are included in a collection with at least one of the seed listings.

* * * * *